US006219164B1

(12) United States Patent
Morgaine

(10) Patent No.: US 6,219,164 B1
(45) Date of Patent: Apr. 17, 2001

(54) DEVICE AND METHOD OF COMMUNICATION BY INFRARED BETWEEN A USER AND A REMOTELY CONTROLLABLE APPARATUS

(75) Inventor: Sylvain Morgaine, Paris (FR)

(73) Assignee: Metalogic (FR)

( * ) Notice: Subject to any disclaimer, the term of this patent is extended or adjusted under 35 U.S.C. 154(b) by 0 days.

(21) Appl. No.: 08/973,161

(22) Filed: Nov. 19, 1997

Related U.S. Application Data

(63) Continuation-in-part of application No. 08/525,026, filed on Nov. 30, 1995, now Pat. No. 5,822,098.

(30) Foreign Application Priority Data

May 19, 1995 (FR) .................................................. 95 06006

(51) Int. Cl.[7] .................................................. H04B 10/00

(52) U.S. Cl. .......................... 359/142; 359/146; 348/734; 340/825.72

(58) Field of Search .................................... 359/142–143, 359/152, 179, 144, 146–148; 340/825.72; 348/734; 455/151.2

(56) References Cited

U.S. PATENT DOCUMENTS 5,519,457 * 5/1996 Nishigaki et al. .................. 359/142

* cited by examiner

*Primary Examiner*—Kinfe-Michael Negash
(74) *Attorney, Agent, or Firm*—Larson & Taylor, PLC

(57) ABSTRACT

A device (1) and process providing an interface between a user (2) and an apparatus (3) which can be remotely controlled by infrared radiation (4). The device includes an infrared signal reception device (16) and at least one series connection (18) as well as a device which process infrared signals corresponding to the programmable apparatus, can code in ASCII and then store the infrared signals in a read-write memory (20) and process the signals coded in this way and/or stored data in order to carry out a specification application. The device also includes at least one individual sensitive sensor which can be actuated by the user and can trigger the emission of the infrared signals for the remote control of the apparatus from the processing device such that the specific application is carried out at least in part.

18 Claims, 4 Drawing Sheets

DEVICE AND METHOD OF COMMUNICATION BY INFRARED BETWEEN A USER AND A REMOTELY CONTROLLABLE APPARATUS

This application is a C-I-P of Ser. No. 08/525,026 filed Nov. 30, 1995, Pat. No. 5,822,098.

FIELD OF THE INVENTION

The present invention relates to a device for interfacing between a user and an apparatus which can be remotely controlled by infrared radiation, furnished with a box comprising data storage means, means for remote control of the apparatus which are configured to transmit infrared signals on the basis of the stored data, and means of communicating with a unit for programming said means of remote control.

It also relates to a method of communication between a user and an apparatus which can be remotely controlled by infrared radiation via a programmable interfacing device.

The invention finds a particularly important although not exclusive application in the field of interactive outlets communicating by infrared radiation, or in the field of home automation, that is to say the field of the use of computerization applied to office or private accommodation.

It also relates to the field of games and interactive toys.

BACKGROUND OF THE INVENTION

Devices or methods making it possible to render apparatuses or systems interactive by infrared radiation are already known.

The latter have drawbacks. In fact, when such devices drive self-contained interactive apparatuses such as videodisc or CD-I players, CD-photos, CD-video, etc. they generally employ expensive and complex means such as for example a microcomputer whose function consists in gathering the signals, processing them via a computer program and then driving the apparatuses. This results, in particular, in great rigidity of utilization.

BRIEF SUMMARY OF THE INVENTION

The present invention aims to provide a device and a method of communication which improve upon those previously known in meeting the requirements of practice, especially in that it offers greater flexibility of utilization and in that it employs inexpensive means which are easy to use for a non-specialist operator.

For this purpose, the invention proposes particularly a device for interfacing between a user and an apparatus which can be remotely controlled by infrared radiation, including a box of small size comprising:

data storage means, means for remote control of the apparatus including means for transmitting infrared signals arranged to control the apparatus on the basis of the stored data, and means of communicating with an external unit for programming said means of remote control, characterized in that said means of communicating comprise infrared signal reception means and at least one serial link, in that said means of remote control comprise processing means for the infrared signals corresponding to the programmable apparatus which are capable of coding into ASCII and then of storing said infrared signals in a read/write memory and of processing said signals thus coded and/or the stored data in order to carry out a specified application with said apparatus, and in that the device comprises at least one individual sensor actuatable by the user and capable of triggering the transmission of the infrared signals for remote control of the apparatus from said processing means, so that said specified application is at least partly carried out.

Advantageously, the device comprises means of visual and/or sound interfacing with the user and means of controlling said interfacing means on the basis of external signals.

In an advantageous embodiment, the external signals are infrared signals transmitted by a second device according to the invention configured so as to send to the first device furnished with the means of visual and/or sound interfacing at least part of the specified application stored in said remotely controllable apparatus.

Advantageously, the invention also proposes a device which includes several connection inputs and several individual sensors located some distance from the box, respectively connected in a removable manner by cabled link to said connection inputs, said sensors being actuatable by the user and capable of triggering the transmission of the infrared signals for remote control of the apparatus from said processing means, so that said specified application is carried out.

Advantageous embodiments moreover resort to one and/or the other of the following provisions:

the sensors are capacitive elements, for example capacitive keys;

at least two sensors are connected in parallel to the same connection input;

the sensors and the processing means are moreover configured to control the transmission of ASCII signals via the serial link;

the means for storing data corresponding to the infrared signals to be transmitted and the sensors are configured so as to be programmed in the form of character strings, so that the totality of instructions for remote control of the apparatus by the device is stored in a single read/write memory;

at least one sensor is configured so as to trigger different transmissions of infrared signals depending on the previous action of the user on said sensor, and/or on one or more other sensors.

This amounts to bestowing several functions upon one and the same sensor.

For example, if six different sensors relate respectively to a video recorder, a videodisc player and a CD player, as well as to the play, rewind and forward functions, previous pressing of the sensor of the apparatus which it is wished to control makes it possible, on contacting the function sensors, to dispatch the infrared signal for controlling the specific apparatus thus previously selected.

at least one infrared signal can be triggered automatically, without any action being exerted on the sensors, in repetitive fashion in accordance with a specified interval.

The invention also proposes an interactive system of communication comprising at least two devices of the type described above which are configured to interact with one another.

The invention further proposes an interactive system for communication by infrared radiation between a user and a remotely controllable apparatus so as to carry out a specified application, comprising a first device furnished with means of visual and/or sound interfacing with the user and with at least one sensor actuatable by the user and capable of triggering the transmission of infrared signals for remote control of the apparatus so as to carry out said specified application, a second device for transmitting and receiving infrared signals, connected to the remotely controllable apparatus, and said remotely controllable apparatus in which at least in part said specified application is stored. More precisely, in the embodiment of this system:

the first device includes processing means configured so as to code and/or store the infrared signals corresponding to the control instructions for the remotely controllable apparatus, the first device comprises means for transmitting such infrared signals corresponding to the control instructions on the basis of the actuation of the sensor or sensors, and means for receiving and processing infrared signals transmitted by the second device, which are capable of controlling the means of visual and/or sound interfacing of said first device, the processing means of the second device are configured so as to fetch the data and/or instructions corresponding to the controls, stored in the remotely controllable apparatus, for the means of visual and/or sound interfacing as a function of the infrared signals corresponding to the instructions for controlling the remotely controllable apparatus and to transmit the infrared signals corresponding to the data and/or instructions configured so as to associate, with the signals received, the data and/or instructions for controlling the means of visual and/or sound interfacing of the first device, as a function of said specified application.

Advantageously at least one same sensor is connected to two different devices.

The invention further proposes a method of communication between a user and an apparatus which can be remotely controlled by infrared radiation via a programmable interfacing device, characterized in that the device being furnished with a box associated with several individual sensors located some distance from said box to which they are respectively connected in a removable manner, the infrared signals corresponding to the remotely controllable apparatus are coded into ASCII and said signals thus coded are stored in a memory of the device, instructions for control of the apparatus corresponding to a specified application are stored in a memory of the device, with each sensor is associated the transmission by the device of infrared signals corresponding to said control instructions, and said infrared transmission is controlled via one or more actions by the user on one or more of said sensors, so that said specified application is carried out.

Advantageously, the infrared signals are stored and instructions for control in the form of character strings are associated with the sensors, the totality of a specified application being stored in one and the same read/write memory.

In an advantageous embodiment the application is loaded into the device by CD-I, videodisc, CD-audio or video signal or the like.

Also advantageously, the method is used to communicate between at least two devices, for example four or five devices.

The invention further proposes a method of communication between a user and an apparatus which can be remotely controlled by infrared radiation so as to carry out a specified application, of the type comprising a first device furnished with means of visual and/or sound interfacing and furnished with at least one sensor actuatable by the user and capable of triggering the transmission of infrared signals for remote control of the apparatus, and a second device for transmitting and receiving infrared signals, which is connected to the remotely controllable apparatus, characterized in that, said remotely controllable apparatus including at least in part the instructions relating to said specified application, the infrared signals corresponding to the instructions for controlling the remotely controllable apparatus are coded into ASCII and said signals thus coded are stored, the transmission by the first device of the infrared signals corresponding to said control instructions are associated with each sensor of the first device, the infrared signals corresponding to the instructions for controlling the means of visual and/or sound interfacing of the first device are coded into ASCII and said signals thus coded are stored;

the infrared transmission of the first device to the second device connected to the remotely controllable apparatus is controlled, via one or more actions by the user on one or more of said sensors, at least one step of the specified application is carried out on the basis of the infrared signals transmitted by the first device and received by the second device, and the transmission by the second device of the infrared signals corresponding to the instructions for controlling the means of visual and/or sound interfacing of the first device is controlled.

Advantageously, the signals corresponding to the control instructions for the devices are stored on a removable medium which can be inserted into the remotely controllable apparatus.

The invention also proposes a method of communication between a user and an apparatus of the type described above, characterized in that said remotely controllable apparatus including at least part of the instructions relating to said specified application, the infrared signals corresponding to the instructions for controlling the remotely controllable apparatus having been coded into ASCII in a memory of the first device and/or in a removable memory, which can be inserted into the remotely controllable apparatus, each sensor being associated with the transmission by the first device of infrared signals corresponding to said control instructions, and the infrared signals corresponding to the instructions for controlling the means of visual and/or sound interfacing of the first device having been coded and stored in a memory of the second device and/or in a removable memory, which can be inserted into the remotely controllable apparatus;

the infrared transmission of the first device to the second device connected to or built into the remotely controllable apparatus is controlled, via one or more actions by the user on one or more of said sensors, at least one step of the specified application is carried out on the basis of the infrared signals transmitted by the first device and received by the second device, and the transmission by the second device of the infrared signals corresponding to the instructions for controlling the means of visual and/or sound interfacing of the first device is controlled, and said operations are repeated iteratively so as to carry out said specified application in whole or in part.

The invention will be better understood on reading the description which follows of an embodiment of the invention, given by way of non-limiting example.

BRIEF DESCRIPTION OF THE DRAWINGS

The description makes reference to the drawings which accompany it, in which.

DETAILED DESCRIPTION OF THE INVENTION

Figure 1:
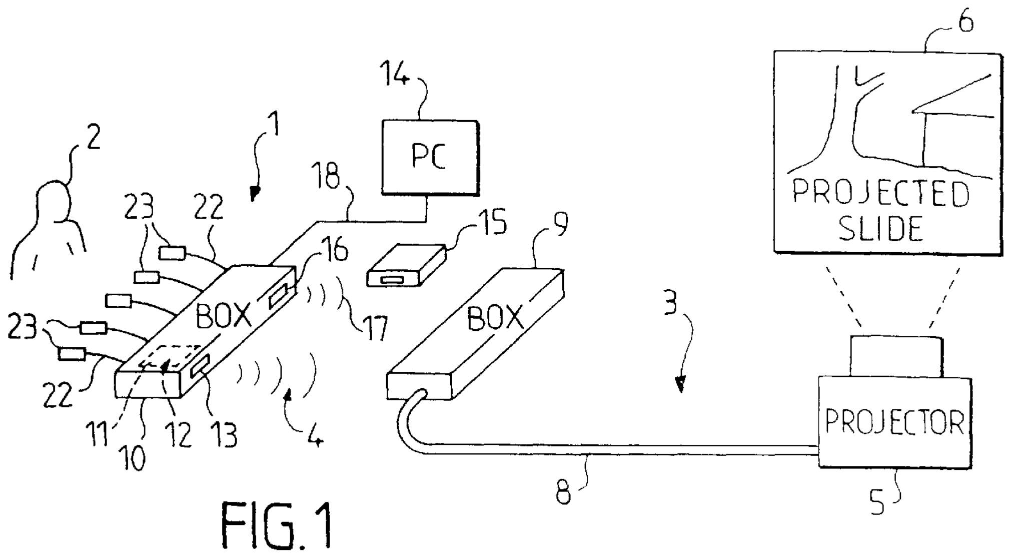
FIG. 1 is a basic diagram showing a system of devices according to the invention which is used to remotely control a slide projector.

FIG. 1 shows a device 1 for interfacing between a user 2 and an apparatus 3 which can be remotely controlled by infrared radiation 4.

In the embodiment described, the remotely controllable apparatus is a projector 5 of slides 6, which is connected via a serial link 8 to a box for receiving infrared radiation 9, which is for example identical to the box of the device 1.

The device 1 comprises a box 10 of small size for example a parallelepipedal metal box of 160 mm×280 mm×70 mm.

The box comprises a mother card furnished with data storage means 11 (see also FIG. 2), means 12 for remote control of the apparatus 5 including means 13 for transmitting infrared signals 4 based on stored data in a manner known per se, by photodiodes.

Means of communication with an external unit 14 (microcomputer) or 15 (IR transmitter) for programming the means 12 of remote control are provided.

They comprise means 16 of receiving infrared signals 17 known per se for example by opto-trigger, for learning sequences originating from the remote control box 15, and at least one RS232 type serial link 18, for example a 4800 baud 8 bit no-parity mini-din 8 3-wire Rx Tx and earth serial interface.

The remote control means 12 comprise means 19 for processing the infrared signals corresponding to the remotely controllable apparatus, here the slide projector, which are capable of coding the infrared signals into ASCII and of storing them in a read/write memory 20 and of processing the signals thus coded and/or the stored data.

More precisely and for example the processing and storage means consist of a CMOS microprocessor from the 68 HC705 family, for example the 68 HC705PCDW CMOS microcontroller manufactured by the Motorola company clocked by a 4.9152 MHz quartz, the associated EEPROM type read/write memory capacity being 1 K bytes, or even 2 K bytes.

The device can operate with positive or negative logic and is electrically powered by battery (not represented) or from the mains.

The device moreover comprises several so-called female digital connection inputs 21 of the type known as "stereo mini-jacks" by those skilled in the art, for example five inputs, but advantageously more, for example twelve, twenty-four or thirty-six inputs.

A sensor 23 is connected to each input via a corresponding electrical cable 22, plugged into the "mini-jack" male plug, all the sensors being for example identical.

In one embodiment, the sensor can be converted into a dry contact, that is to say all or nothing, for example by connecting one of the earths of the double cable of the "mini-jacks" to the contact wire (red cladding), the 5 volt supply wire being insulated.

The sensor can also be a sensor which can be actuated by sound (human voice) or a specified change in the physical environment of the sensor (humidity, smoke, etc.).

In the embodiment more particularly described here the sensors 23 consist of rectangular capacitive keys with small dimensions for example 2 cm×3 cm×0.5 cm.

One face of the key is in the form of a metal plate and constitutes an antenna making it possible to detect a substance containing liquid, such as the finger of a hand for example, contacting or distant by as much as a few centimeters, or via an intermediary electrically conducting element such as a metal object.

The metal plate can be embedded in a more or less thick material of the resin type so as to modify the sensitivity of the antenna.

An embodiment of this sensor is described for example in the document EP-A-070,126 using a capacitive sensor employing a Wien Bridge oscillator in which said antenna is connected to the positive feedback circuit of the oscillator.

The inputs 21 themselves are plugged into the bus 24, via a converter circuit 15 known per se, the bus 24 moreover allowing interactive plugging-in and operation in various elements of the card furnished as seen with the means 13, 16, 18, 19 and with the EEPROM memory 20.

Figure 2:
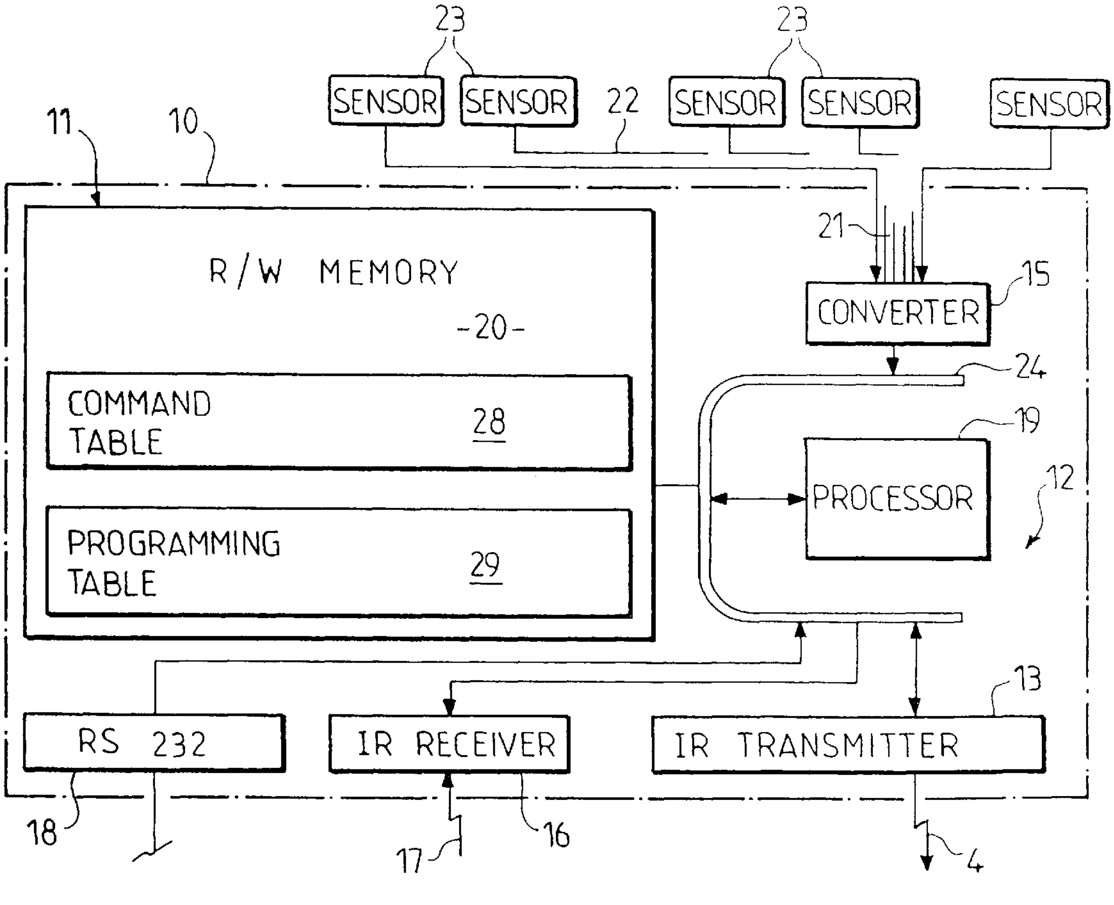
FIG. 2 is a block diagram of a device according to the embodiment of the invention more particularly described here.
Figure 3:
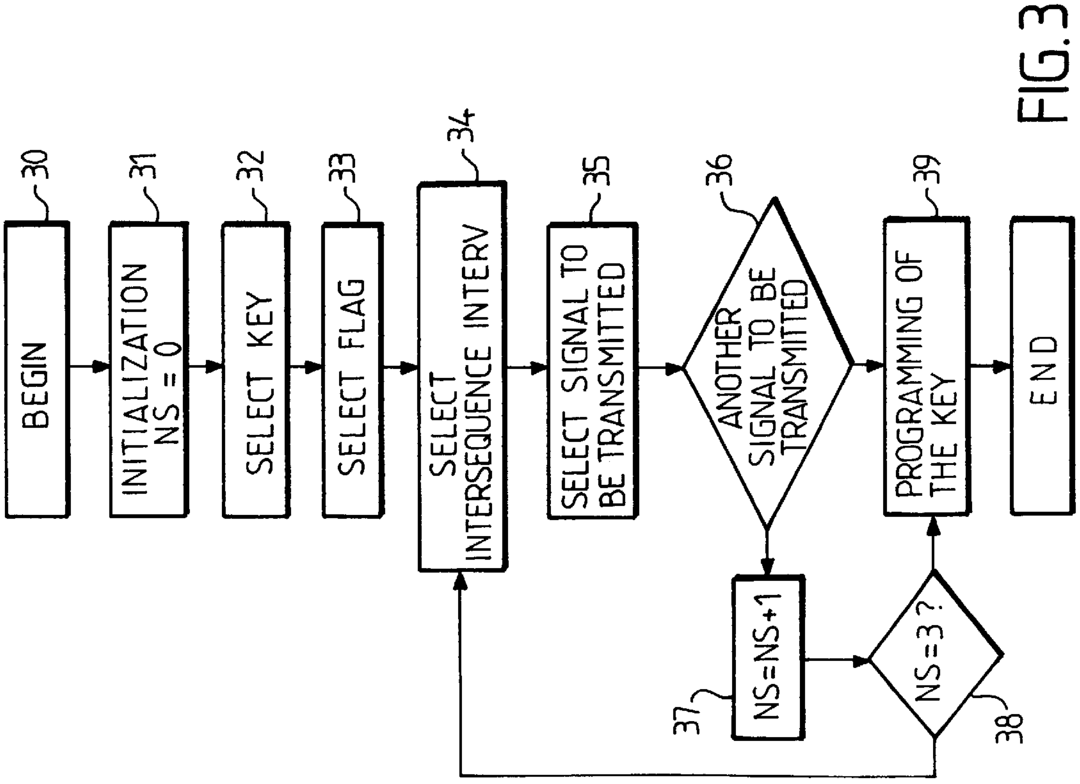
FIG. 3 is a flowchart for programming a sensor belonging to the device according to the invention.

The programming of the device 1 according to the embodiment of the invention more particularly described here will now be described with reference to FIGS. 2, 3 and 4.

This programming is performed for example via a microcomputer 14 connected to the serial link 18 of the device 1.

On switching on the device 1, the software implemented by the processing means analyses the state of the inputs 21 corresponding to the sensors and performs the associated processing operations depending on the values contained in the command table 28 and programming table 29 which will be detailed below.

The command table 28 includes for example 48 records.

These records can equally well be infrared signals or character strings.

In the embodiment more particularly described here, each record is composed of for example 24 bytes.

The first byte represents the nature of the signal recorded. This byte has the value 0 for an ASCII character string and N ($0<N<24$) for an infrared signal, N representing the number of bytes required to code the signal.

In the case in which the first byte is equal to 0, the succeeding bytes correspond to an ASCII character string to be transmitted over the serial link.

In the case of an infrared signal to be transmitted (means 13), the succeeding bytes correspond to the ASCII coding of the infrared signal.

A command table can, for example, contain the following values:

| table entry | type of signal | signal |
|---|---|---|
| 1 | 0 | "string number 1" |
| 2 | 8 | 24 22 22 55 55 55 48 2F |
| 3 | 0 | "string number 2" |
| 4 | 0 | "string number 3" |
| 5 | 11 | 94 22 22 48 98 32 44 48 32 32 4F |

The ASCII coding of an infrared signal is represented by a sequence of bytes (1 byte=8 bits) indicating the times of infrared transmission. For example, the byte "94" indicates an infrared transmission time of 9×N ms with a gap of 4×N ms before processing the next byte.

The programming table 29 includes, for example, likewise 48 records.

Here, in the embodiment described, each record is composed of for example 6 bytes.

The first byte corresponds to the input 21 of the sensor N ($0<N\leqq 12$).

The second byte corresponds to a "flag" field allowing the programming of conditional actions. If this byte is equal to 0 then the sequence for programming the succeeding bytes is executed immediately; if this byte is greater than 0 then this value is compared with those present in the table entries comprising the programming of the flags and the corresponding sequence is then executed immediately.

The succeeding bytes are coded in groups of 2 bytes:

the first byte corresponds to an interval of X sec ($0\leqq x\leqq 128$), the second byte corresponds to the entry in the command table corresponding to the signal to be transmitted.

A programming table can, for example, contain the following values:

| table entry | input | Flag | interv1 | signal1 | interv2 | signal2 . . . |
|---|---|---|---|---|---|---|
| 1 | 1 | 0 | 4 | 1 | 6 | 0 |
| 2 | 3 | 1 | 0 | 4 | 0 | 1 |
| 3 | 3 | 2 | 0 | 5 | 0 | 1 |
| 4 | 8 | 0 | 0 | 8 | 0 | 0 |

By way of example, the programming of a key is described below while referring to FIG. 3.

After the begin step 30 and the initialization step 31, the key to be programmed is selected at 32, the "Flag" is selected if appropriate at 33, then the intersequence gap at 34 (the gap specifies the number of seconds to wait before transmitting the IR signal or the character string), and then the signal to be transmitted is selected (step 35) by indicating its index in the command table. At 36 there is a test of whether another signal should be transmitted. In the affirmative (step 37) and if the number of signals to be transmitted Ns is less than n (test 38) the operation is repeated, otherwise the key is programmed at 39. In the mode described here, the number n is taken equal to 3.

The essential commands employed during programming will now be described. Each command is composed of a prefix followed by optional programming parameters followed by a carriage return.

Figure 4:
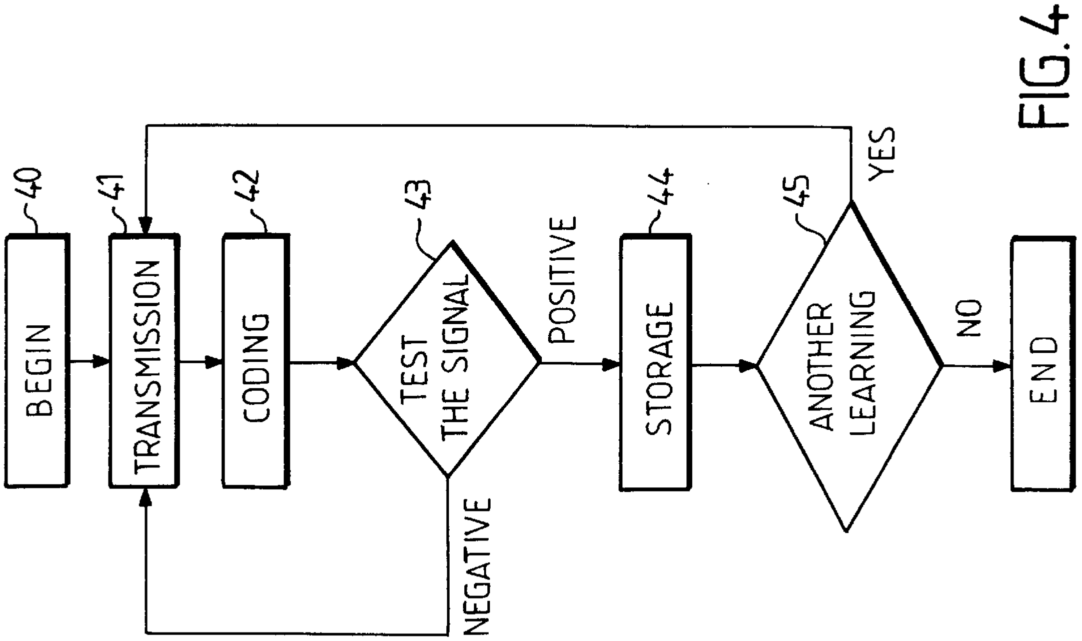
FIG. 4 is a flowchart for coding an infrared signal into ASCII characters, which is used with the method according to the invention.

We firstly detail the commands for the infrared interface while describing the acquisition of an infrared sequence with reference to FIG. 4.

LIR<carriage return>

The device 1 is set into the phase for detecting an infrared sequence (step 40).

Having detected a sequence (step 41), the latter is coded and retransmitted (step 42) to the serial port as follows:

<number of data><><hexadecimal data><carriage return>

The signal received is tested at 43. If the result is positive, the signal is stored (step 44) in read/write memory 20. By positive is understood the correct restoring by the device of the signal received.

If appropriate, the operation is repeated (step 45).

The testing of an infrared sequence (step 43) is performed via the following command:

TIR<carriage return>

On receiving the <carriage return> the device transmits the infrared sequence corresponding to the coded data.

In the embodiment more particularly described here, memory storage of an infrared sequence in the command table is obtained as follows:

MIR<table entry><carriage return> for example,

LIR, 11 94 22 22 48 98 32 44 48 32 32 4F

MIR 1 implies that the infrared signal sequence:

11 94 22 22 48 98 32 44 48 32 32 4F is stored in entry 1 of the command table.

We now describe the writing of data to the command table.

The above is done in the form of a character string, as follows:

CMD<><table enty><>type of signal> <> <data> <carriage return> for example,

CMD 1 0 string number 1 implies that the character string: "string number 1" is stored in entry 1 of the command table or else,

CMD 5 11 94 22 22 48 98 32 44 48 32 32 4F implies that the infrared signal coded as follows:

94 22 22 48 98 32 44 48 32 32 4F is stored in entry 5 of the command table.

As regards the writing of data to the programming table, this is done for example in the form of a character string, as follows:

PRG<><table entry><><sensor><><Flag><><program><carriage return> i.e. for example,

PRG 2 3 1 0 4 0 1 implies that the following instructions are stored in entry 2 of the programming table:

If the Flag is equal to 1, the transmission of the signal stored at entry 4 of the command table and then the transmission of the signal stored at entry 1 of the command table is associated with the sensor of input number 3 of the device.

The operation of the device 1 according to the invention will now be described with reference to FIG. 1.

The infrared signals for controlling the projector 5 are firstly coded into ASCII with the micro-computer 14. For example, if the projector is one in which all the commands for access to a slide are composed of digits from 0 to 9, then a hexadecimal coding is chosen composed of bytes which are sufficiently distinct for the projector to be able to operate reliably.

Having performed the coding, several cycles of slides are programmed in the same way and the IR signals and the command instructions are loaded directly, in the form of character strings, into the same memory 20 via the link 18.

The operator 2 next programs the keys depending on the instructions as described above.

On the apparatus 5 side, there is provision for an IR receiver, which in this instance is a device identical to the device 1, whose serial link is connected to the projector.

The signals received and coded then become the commands for the projector.

When the operator presses a key, he thus remotely controls, in an extremely simple, reliable and interactive way, a slide show with synchronized sound, of for example several tens of slides.

Figure 5:
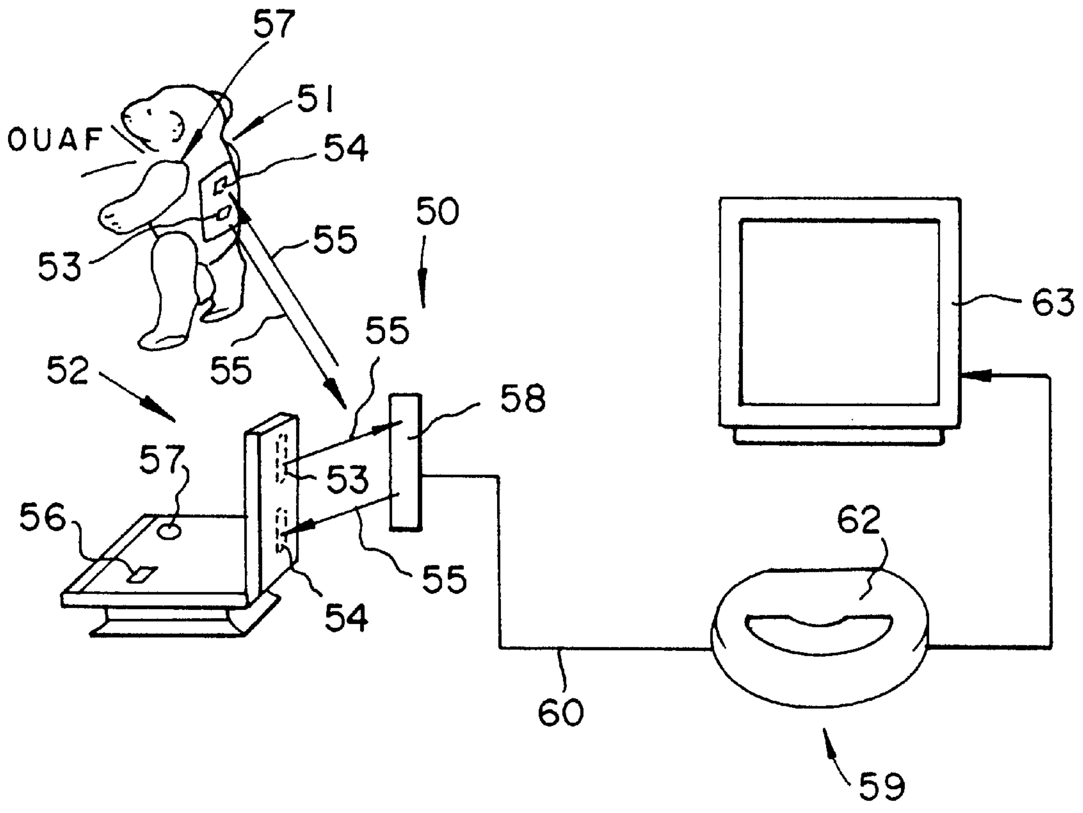
FIG. 5 is a basic diagram showing a second embodiment of a system according to the invention, used interactively.

Represented in FIG. 5 is a system 50 comprising a first device according to the invention 51 or 52 furnished with infrared radiation 55 transmitter 53 and receiver 54 means.

The first device can, for example, be a cuddly animal 51 or a games table 52. It comprises means 56 for visual interfacing (a liquid crystal screen, leds etc.) and/or means 57 for sound interfacing (loudspeaker and associated circuits).

The system comprises a second device 58 connected to or built into a remotely controllable apparatus 59, for example either via a cabled link 60, or directly associated with the motherboard of the apparatus.

The remotely controllable apparatus 59 is, for example, a games console 62 which contains the interactive application stored in a memory, for example CD-ROM, games cartridge etc. The console is connected to a television 63 or to a computer.

The corresponding data to the application are for example structured into two parts:

- the computational and display data which are processed within the remotely controllable apparatus 59 itself,
- the interfacing data intended to be dispatched to the first device 51 or 52.

Figure 6:
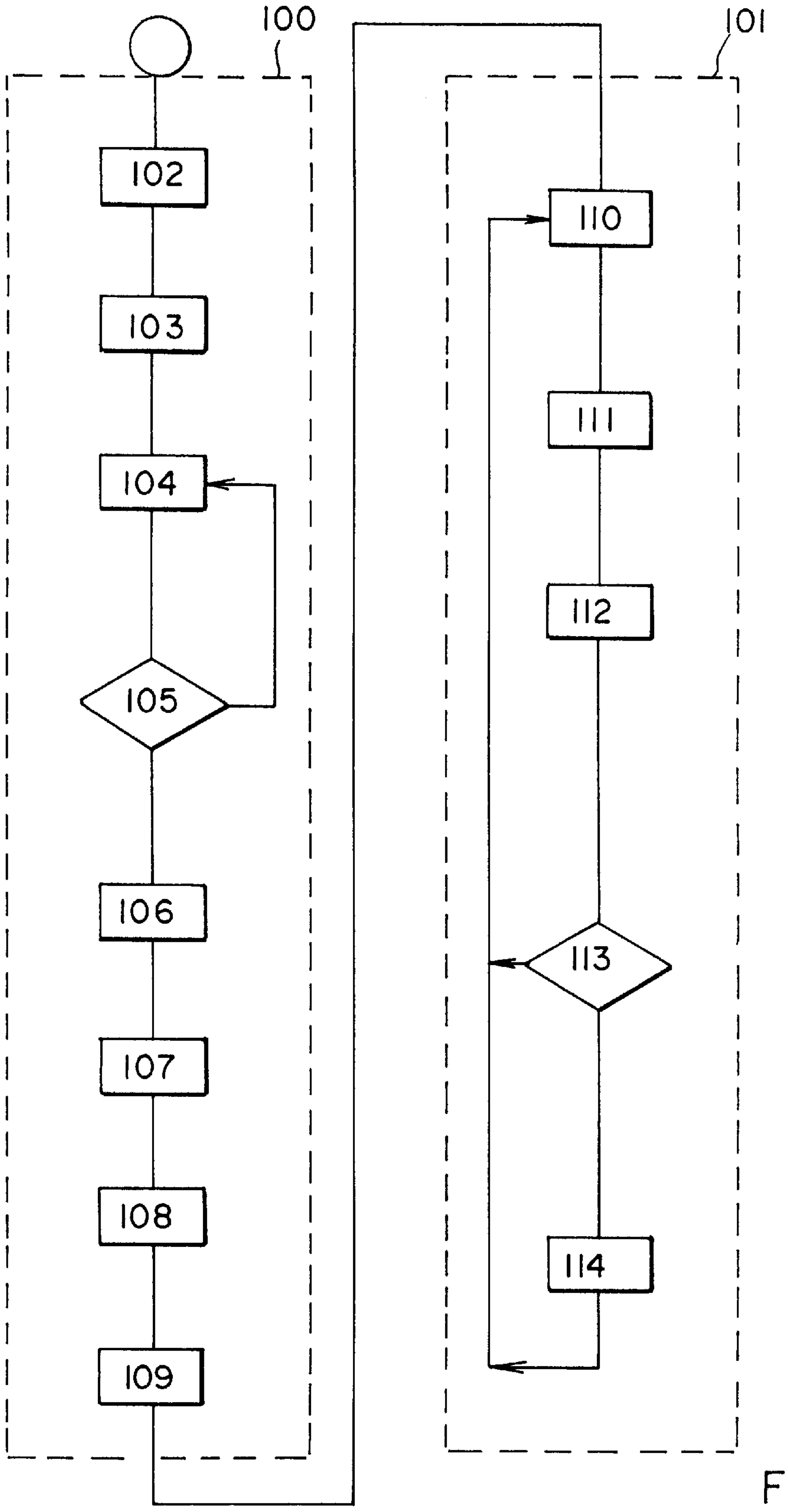
FIG. 6 is a partial operational flowchart of the system described with reference to FIG. 5.

FIG. 6 is a simplified flowchart giving the main steps of the protocol for communication between the first device 51 or 52 and the second device 58 according to the embodiment of the invention more particularly described here.

The data and/or infrared instructions are coded as described previously and/or as described in document FR-A-2,718,553.

The protocol includes a first step 100 termed the protocol initialization step, a second step 101 termed the bidirectional communication step and the dialogue steps proper.

The first two steps 100 and 101 (shown in dashed lines in FIG. 6) comprise the following sub-steps:

Step 100 (initialization of the protocol)

- (102): Switching on of the remotely controllable apparatus 59 and of the second device 58, possibly built into the remotely controllable apparatus.
- (103): Downloading into a memory of the second device 58 of the parameters for interfacing with the first device 51 or 52.
- (104): Displaying (on the Television 63) of a message requesting switching on of the first device.
- (105): After a time equal for example to 20 seconds, if the second device receives no signal from the first device then the remotely controllable apparatus 59 transmits a sound signal and we return to step 104.
- (106): Transmission of an infrared code from the first device to the second device indicating that the first device is on.
- (107): Placing of the first device into infrared reception mode.
- (108): Transmission of an infrared code from the second device to the first device indicating that communication is established.
- (109): Reception and validation of said code transmitted at 108 by the first device.

Step 101 (Bidirectional communication)

The communication loop between the second device and the first device is for example structured as follows:

- (110): Placing of the first device into infrared reception mode.
- (111) Transmission by the second device of the interfacing data.
- (112): Reception by the first device of the interfacing data.
- (113): If the data have not been correctly gathered, an infrared code is dispatched to the second device for re-transmission of the data and we return to step 110.
- (114): Processing of the data by the first device.

The steps of dialogues proper consist in controlling the first device, for example 51, on the basis of the information sent interactively with the apparatus 59.

For example the user (a child) inserts a cartridge entitled “cuddly bear” into the games console (remotely controllable apparatus), and sees displayed on the screen of the television the message “Hello”, press your bear’s tummy (step 106).

When the child presses on the tummy he actually presses on a sensor and an infrared signal is sent to the device 58.

The remotely controllable apparatus then prompts the display on the screen, the “first screen” of the application “cuddly bear” (step 108). The application is for example a story in the form of an electronic book whose contents are then read by way of the first device built into the cuddly bear.

A depiction of the book on the screen is defined for example by five icons. Each of the icons indicates to the child which part of the bear to use in order to move about interactively within the book depicted on the television screen. For example, one icon indicates to the child that by pressing on the bear’s eye he will be able to see the image move. A second icon enables the child to listen to a sound commentary; a third icon offers the possibility of choosing with respect to a given question and of confirming his answer; finally the fourth and fifth icons make it possible to move around within the book.

For example, on the right-hand page of the book may be seen three menus corresponding to three questions asked of the child. When the child presses on a sensor, for example the bear’s nose, he causes a menu No. 2 to light up indicating that he has chosen answer No. 2; if he then presses on the bear’s tummy he will thus confirm the answer, otherwise he can press on another sensor (for example the arm) to return to menu No. 1 or else once again on the nose in order to select menu No. 3 etc.

What is claimed is:

1. A device for interfacing between a user and a programmable apparatus which can be remotely controlled by infrared radiation, comprising:

a box of small size including a) data storage means, b) means for remote control of the apparatus including means for transmitting infrared signals on the basis of data stored in said data storage means, and c) means for communicating with an external unit for programming said means for remote control, said means for communicating comprising infrared signal reception means and at least one individual sensor actuatable by the user and capable of triggering a transmission of infrared signals for remotely controlling the apparatus;

wherein said means for remote control comprise (i) first processing means for processing infrared signals corresponding to the programmable apparatus, said first processing means being configured so as to code said infrared signals into ASCII and then to store said infrared signals in a read/write memory and so as to process said infrared signals thus coded and the data stored in said data storage means in order to carry out at least in part a specified application with said apparatus; and wherein the individual sensor actuatable by the user is configured so as to trigger the transmission of the infrared signals for remote control of the apparatus from said first processing means, so that said specified application is at least partly carried out.

2. The device according to claim 1, which further comprises interfacing means for interfacing with the user by one of vision and sound, and means for controlling said interfacing means with external signals.

3. The device according to claim 2, which further includes a separate device which includes said interfacing means and said means for controlling said interfacing means; and wherein said separate device further includes second processing means for processing infrared signals transmitted by said first processing means which is configured so as to send to the separate device at least one part of the specified application stored in said remotely controllable apparatus.

4. The device according to claim 1, which further comprises a plurality of connection inputs and a plurality of said individual sensors located remotely from the box, cable links which removably connects said individual sensors to respective said connection inputs, wherein said individual sensors are actuatable by the user and capable of triggering the transmission of the infrared signals for remote control of the apparatus from said first processing means so that said specified application is carried out.

5. The device according to claim 4, wherein the individual sensors are one of capacitive keys or elements.

6. The device according to claim 4, wherein at least two of said individual sensors are connected in parallel to a same said connection input.

7. The device according to claim 4, wherein the individual sensors and the first processing means are moreover configured to control a transmission of the ASCII signals via a serial link to the external unit.

8. The device according to claim 1, wherein the first processing means for storing the infrared signals to be transmitted and the at least one individual sensor are configured so as to be programmed in character strings, so that all instructions for remote control of the apparatus are stored in a single said read/write memory.

9. The device according to claim 1, wherein a first one of said at least one individual sensor is configured so as to trigger different transmissions of infrared signals depending on a previous action of the user on a second one of said at least one individual sensor.

10. The device according to claim 1, wherein said at least one sensor is configured so as, after having been actuated a first time, to trigger regularly thereafter a sequence of events in accordance with a specified interval.

11. The device according to claim 1, including a second box configured to interact with said first-mentioned box.

12. An interactive system for communication by infrared radiation between a user and a remotely controllable apparatus so as to carry out a specified application, comprising:

a first device including a) interfacing means for one of visual or sound interfacing with the user, and b) at least one sensor actuatable by the user and capable of triggering a transmission of infrared signals for the remotely controllable apparatus, a second device for transmitting and receiving infrared signals, said second device being associated with the remotely controllable apparatus in which at least in part the specified application is stored, wherein said first device further includes a) transmitting means for transmitting infrared signals corresponding to control instructions for the controllable apparatus on the basis of an actuation of the at least one sensor, and b) receiving means for receiving and processing infrared signals transmitted by the second device, which infrared signals from the second device are capable of controlling the interfacing means, c) first processing means configured so as to code into ASCII, and to store, the infrared signals corresponding to the control instructions for controlling the remotely controllable apparatus, wherein said second device includes a second processing means for receiving the infrared signals corresponding to the control instructions for controlling the remotely controllable apparatus from the transmitting means and for issuing associated commands to the remotely controllable apparatus, and for transmitting infrared signals corresponding to the control instructions for controlling the interfacing means of the first device, as a function of the specified application.

13. An interactive system according to claim 12, wherein the at least one sensor is connected respectively to said first and second devices.

14. A method of communication between a user and an apparatus which can be remotely controlled by infrared radiation via a programmable interfacing device, comprising the steps of:

providing the device with a box associated with several individual sensors located some distance from said box and connecting the respective sensors to the box in a removable manner, coding infrared signals corresponding to the remotely controllable apparatus into ASCII and storing said signals thus coded in a memory of the device, storing control instructions for control of the apparatus corresponding to a specified application in a memory of the device, associating with each sensor a transmission by the device of infrared signals corresponding to said control instructions, and controlling said infrared transmission via one of more actions by the user on one or more of said sensors, so that said specified application is carried out.

15. A method of communication between a user and an apparatus which can be remotely controlled by infrared radiation so as to carry out a specified application, including (a) a first device having (i) interfacing means and (ii) at least one sensor actuatable by the user and capable of triggering a transmission of infrared signals for remote control of the apparatus, and (b) a second device for transmitting and receiving infrared signals and which is connected to the remotely controllable apparatus, and wherein said remotely controllable apparatus includes at least in part instructions relating to said specified application, the method comprising the steps of:

coding the infrared signals corresponding to instructions for controlling the remotely controllable apparatus into ASCII and storing said signals thus coded, associating the transmission by the first device of the infrared signals corresponding to said control instructions with each sensor of the first device, coding the infrared signals corresponding to the instructions for controlling the interfacing means of the first device into ASCII and storing said signals thus coded;

controlling the infrared transmission of the first device to the second device connected to the remotely controllable apparatus, via one or more actions by the user on one of more of said sensors, carrying out at least one step of the specified application on the basis of the infrared signals transmitted by the first device and received by the second device, and controlling the transmission by the second device of the infrared signals corresponding to the instructions for controlling the interfacing means of the first device.

16. A method of communication between a user and an apparatus which can be remotely controlled by infrared radiation so as to carry out a specified application, including (a) a first device having (i) interfacing means and (ii) at least one sensor actuatable by the user and capable of triggering a transmission of infrared signals for remote control of the apparatus, and a second device for transmitting and receiving infrared signals and which is connected to the remotely controllable apparatus, wherein said remotely controllable apparatus includes at least in part instructions relating to said specified application, the infrared signals corresponding to the instructions for controlling the remotely controllable apparatus having been coded into ASCII in a memory, wherein each sensor is associated with the transmission by the first device of infrared signals corresponding to said control instructions, and wherein the infrared signals corresponding to the instructions for controlling the interfacing means of the first device have been coded and stored in a memory, the method comprising the steps of:

controlling the infrared transmission of the first device to the second device which is associated with the remotely controllable apparatus, via one or more actions by the user on one or more of said sensors, carrying out at least one step of the specified application on the basis of the infrared signals transmitted by the first device and received by the second device, controlling the transmission by the second device of the infrared signals corresponding to the instructions for controlling the interfacing means of the first device, and repeating said steps iteratively so as to carry out said specified application in whole or in part.

17. The method according to claim 14, further comprising the steps of storing the infrared signals and associating control instructions for the apparatus in the form of character strings with the sensors, the totality of a specified application being stored in a read/write memory.

18. The method according to claim 14, further comprising the step of loading the application into the first device.

* * * * *